United States Patent
Park

(10) Patent No.: US 8,635,485 B2
(45) Date of Patent: *Jan. 21, 2014

(54) COMPUTER AND CONTROL METHOD THEREOF

(71) Applicant: Samsung Electronics Co. Ltd., Suwon-si (KR)

(72) Inventor: Jeong-Gyu Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/754,000

(22) Filed: Jan. 30, 2013

(65) Prior Publication Data

US 2013/0145192 A1   Jun. 6, 2013

Related U.S. Application Data

(63) Continuation of application No. 12/859,610, filed on Aug. 19, 2010, now Pat. No. 8,386,821, and a continuation of application No. 11/517,278, filed on Sep. 8, 2006, now Pat. No. 7,802,122.

(30) Foreign Application Priority Data

Sep. 14, 2005   (KR) .................. 10-2005-0085756

(51) Int. Cl.
*G06F 1/00*     (2006.01)
*G06F 11/30*    (2006.01)

(52) U.S. Cl.
USPC ............ 713/340; 713/300; 713/320; 323/282

(58) Field of Classification Search
USPC ..................... 713/300, 320, 340; 323/282
See application file for complete search history.

(56) References Cited

U.S. PATENT DOCUMENTS

| | | |
|---|---|---|
| 6,388,432 B2 | 5/2002 | Uchida |
| 6,424,128 B1 | 7/2002 | Hiraki et al. |
| 6,523,128 B1 | 2/2003 | Stapleton et al. |
| 6,580,258 B2 | 6/2003 | Wilcox et al. |
| 6,693,412 B2 | 2/2004 | Ruan et al. |
| 6,694,272 B1 | 2/2004 | Zvonar |
| 6,727,681 B2 | 4/2004 | Morita |
| 6,815,935 B2 | 11/2004 | Fujii |
| 6,816,978 B1 | 11/2004 | Kaminski et al. |
| 6,836,417 B2 | 12/2004 | Hiraki et al. |
| 7,049,802 B2 | 5/2006 | Ruan et al. |
| 7,071,660 B2 | 7/2006 | Xu et al. |

(Continued)

FOREIGN PATENT DOCUMENTS

| | | |
|---|---|---|
| JP | 3-28939 A | 2/1991 |
| JP | 5-250074 A | 9/1993 |

(Continued)

*Primary Examiner* — Jaweed A Abbaszadeh
(74) *Attorney, Agent, or Firm* — Jefferson IP Law, LLP

(57) ABSTRACT

A computer includes a CPU and a system unit, and further includes a power source which generates source power, a system driving power generator which converts the source power to system power and which provides power to the system unit, a CPU driving power generator which outputs driving power to drive the CPU, and a controller which selectively supplies the source power or the system power to an input terminal of the CPU driving power generator according to an operation mode of the CPU. Thus, a computer adjusts a level of power supplied to a CPU driving power generator according to a CPU mode and improves power efficiency, and includes a control method thereof.

15 Claims, 8 Drawing Sheets

(56) References Cited

U.S. PATENT DOCUMENTS

| | | |
|---|---|---|
| 7,203,847 B2 | 4/2007 | Park |
| 7,268,527 B2 | 9/2007 | Horner |
| 7,282,984 B2 | 10/2007 | Kim et al. |
| 7,370,213 B2 | 5/2008 | Odaohhara |
| 7,401,241 B2 | 7/2008 | Rotem et al. |
| 7,594,126 B2 | 9/2009 | Yun et al. |
| 2001/0004207 A1 | 6/2001 | Uchida |
| 2001/0007134 A1 | 7/2001 | Odaohhara |
| 2002/0017897 A1 | 2/2002 | Wilcox et al. |
| 2002/0083355 A1 | 6/2002 | Clark et al. |
| 2003/0009702 A1 | 1/2003 | Park |
| 2003/0067289 A1 | 4/2003 | Morita |
| 2003/0211870 A1 | 11/2003 | Jiguet et al. |
| 2005/0017790 A1 | 1/2005 | Kim et al. |
| 2006/0255777 A1 | 11/2006 | Koertzen |
| 2007/0019442 A1 | 1/2007 | Li et al. |

FOREIGN PATENT DOCUMENTS

| | | |
|---|---|---|
| JP | 9-84332 A | 3/1997 |
| JP | 2001-34502 A | 2/2001 |
| JP | 2003-143835 A | 5/2003 |
| KR | 1999-068883 A | 9/1999 |

FIG. 5

|  | BATTERY MARK (10w CONSUMED ON AVERAGE) | | Perform-170 (20w CONSUMED ON AVERAGE) | |
|---|---|---|---|---|
|  | CONVENTIONAL | PRESENT | CONVENTIONAL | PRESENT |
| DC/DC LOAD | 0.5A | 2A | 1A | 2.5A |
| DC/DC EFFICIENCY | 70% | 88% | 74% | 92% |
| CPUVRM LOAD | 5A | 5A | 15A | 15A |
| CPUVRM EFFICIENCY | 65% | 87% | 80% | 89% |
| CPUVRM OVERALL EFFICIENCY | 65% | 77% | 80% | 82% |
| DC/DC+VRM EFFECT |  | 0.8watt SAVED |  | 0.9watt SAVED |
| 6cell(53.28wh) EFFECT |  | ~28min |  | ~9min |

COMPUTER AND CONTROL METHOD THEREOF

CROSS-REFERENCE TO RELATED APPLICATIONS

This application is a continuation application under 35 U.S.C. §120 of a U.S. patent application Ser. No. 12/859,610, filed on Aug. 19, 2010, which is a continuation application under 35 U.S.C. §120 of a U.S. patent application Ser. No. 11/517,278, filed on Sep. 8, 2006, which issued as U.S. Pat. No. 7,802,122 on Sep. 21, 2010, and which claims the benefit of Korean Patent Application No. 10-2005-0085756, filed on Sep. 14, 2005, in the Korean Intellectual Property Office, the disclosures of each of which is incorporated herein by reference.

BACKGROUND OF THE INVENTION

1. Field of the Invention

Aspects of the present invention relate to a computer and a control method thereof, and more particularly, to a computer having improved power efficiency and a control method thereof.

2. Description of the Related Art

Advanced Configuration and Power Interface (ACPI) is an open solution which is applicable to computer hardware, operating systems (OS), software and peripheral device interfaces. This open solution assists operating systems, hardware and peripheral devices, which are developed by Intel Inc., Microsoft, and Toshiba, to communicate with one another during power utilization.

In a conventional computer, a power management system operates on the basis of a basic input/output system (BIOS), so that parts of the computer should have a non-operation period before the computer is disconnected from a power supply. A primary goal of the ACPI is to enable an OS to include Operating System Directed Power Management (OSPM), which manages overall power activities, thereby providing the parts of the computer with power only when power is needed for the computer to operate correctly.

The ACPI announced in 1996 defines operation modes related to the power state of a CPU as C 0, C 1, C 2 and C 3 Here, the C 0 state is defined as a normal state, the C1 state is defined as a halt state, the 2 state is defined as a stop-grant state, and the C 3 state is defined as a stop clock state.

The CPU performs a minimum operation, such as snooping, to keep a cache relationship in C 2 state. In the C 3 state, which is also defined as a deep sleep mode, since an external clock is not supplied to the CPU, overall operations of a processor are stopped except for the function of maintaining data, which is stored in the cache memory of the CPU. Accordingly, less power is consumed in the deep sleep mode than in the C2 state.

Recently, Intel Inc. has developed Intel mobile voltage positioning II (IMVP II) as an improved voltage regulation technology which adopts C4 as a new power mode of the CPU, i.e., a deeper sleep mode. In this deeper sleep mode, a voltage level of power supplied to the CPU is lower than the voltage level of power supplied to the CPU during the C3 state, thereby minimizing power consumption while the CPU does not operate.

A conventional computer includes a power source, such as a battery or an adapter, a CPU, and a CPU driving power generator, which generates CPU driving power from source power which has been outputted from the power source. The CPU driving power generator, which is provided in the conventional computer, includes a switch. Due to this switch's switching operation, this switch causes switching loss and conduction loss to occur. Since the conduction loss is proportional to the current level, the conduction loss increases as the current level increases. Thus, the switching loss takes a large portion of the whole loss in the CPU driving power generator in case of a low level of current, thereby giving a great effect in lowering power efficiency. The CPU driving power generator provided in the conventional computer generates the CPU driving power from the source power, which outputs a high voltage from the power source regardless of the current level, thereby lowering power efficiency.

SUMMARY OF THE INVENTION

Accordingly, it is an aspect of the present invention to provide a computer which adjusts the level of power supplied to the CPU driving power generator according to a CPU mode and improves power efficiency, and a control method thereof.

Additional aspects and/or advantages of the invention will be set forth in part in the description which follows and, in part, will be obvious from the description, or may be learned by practice of the invention.

The foregoing and/or other aspects of the present invention are also achieved by providing a computer including a CPU and a system unit, further including a power source, a system driving power generator which converts source power input from the power source to be output to the system unit, a CPU driving power generator which outputs driving power to drive the CPU, and a controller which selectively supplies the source power or the system power to an input terminal of the CPU driving power generator according to an operation mode of the CPU.

According to another aspect of the present invention, a method of controlling a computer having a CPU and a system unit is provided. The method includes supplying source power outputted from a power source to a system driving power generator, supplying power from the system driving power generator to the system unit, converting the source power into system power using the system driving power generator, determining an operation mode of the CPU, and selectively supplying a CPU driving power generator with either source power or system power according to the determined operation mode of the CPU.

According to another aspect of the present invention, a computer comprising a CPU and a system unit, further comprising a controller which adjusts a power supply supplied to the CPU by a CPU driving power generator by determining a power mode the CPU is operating in, is provided. The controller comprises a CPU mode determiner which determines the power mode, and a plurality of switches which are switched on and off depending on whether the CPU mode determiner determines that the power mode is a normal mode or a power saving mode. The plurality of switches comprise a first switch which, when switched on, supplies source power from a power source to the CPU driving power generator when the CPU mode determiner determines that the CPU is operating in a normal mode, and a second switch which, when switched on, supplies system power from a system driving power generator, which converts the source power to the system power, to the CPU driving power generator when the CPU mode determiner determines that the CPU is operating in a power saving mode, wherein the system driving power generator supplies power to the system unit.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 5 is a table which compares the efficiency between a conventional computer and a computer according to aspects of the present invention.

DETAILED DESCRIPTION OF THE EMBODIMENTS

Figure 1:
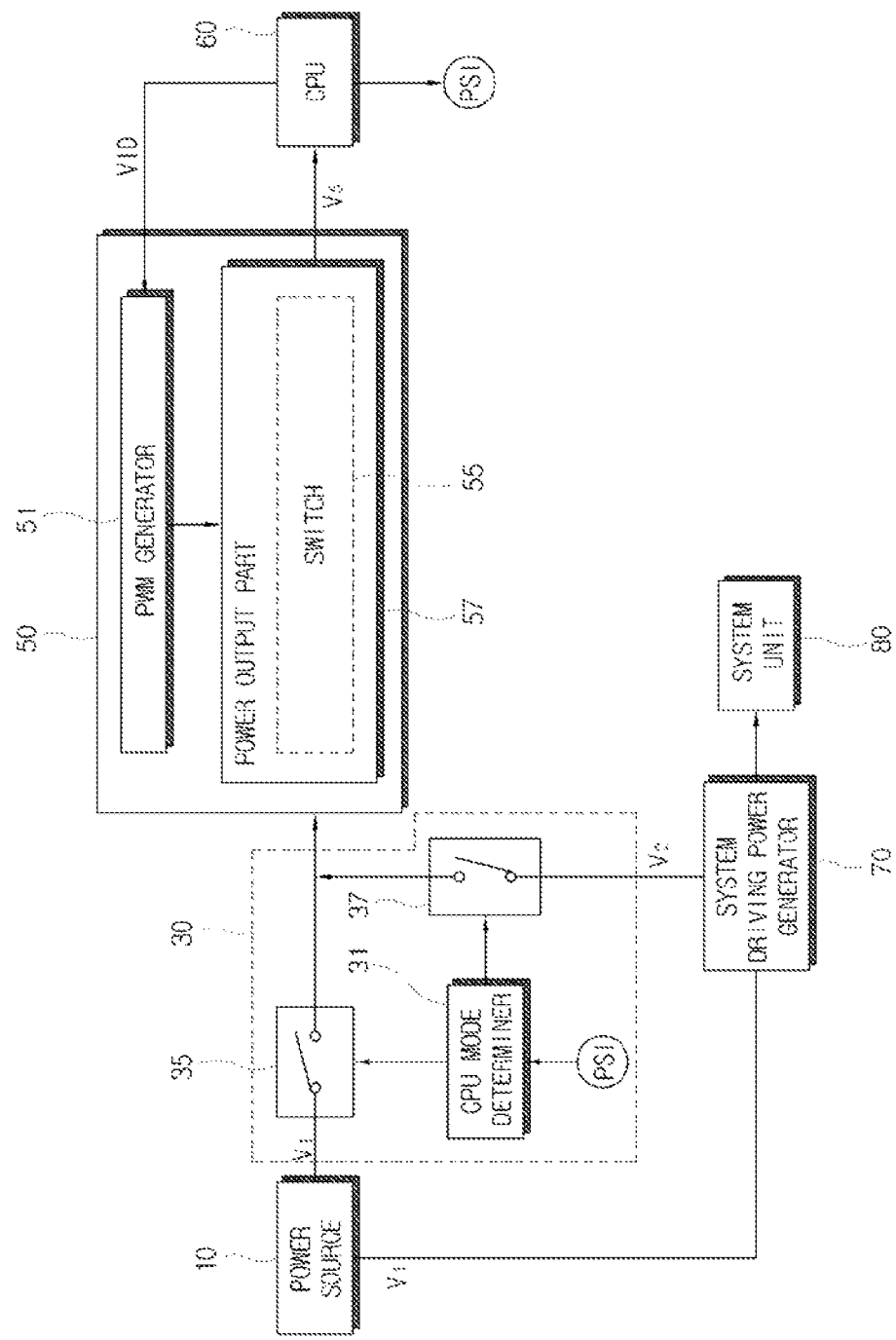
FIG. 1 is a control block diagram of a computer according to a first embodiment of the present invention.

Reference will now be made in detail to the present embodiments of the present invention, examples of which are illustrated in the accompanying drawings, wherein like reference numerals refer to elements throughout. The embodiments are described below in order to explain the present invention by referring to the figures.

As shown in FIG. 1, a computer according to a first embodiment of the present invention includes a power source 10, a CPU 60, a system unit 80, a CPU driving power generator 50, a system driving power generator 70 and a controller 30.

The power source 10 may be, for example, an adapter or a battery. The power source 10 outputs source power (a voltage level of this power source 10 is represented by V1 in FIGS. 1 and 2) to either the system driving power generator 70, the CPU driving power generator 50, or both of the system driving power generator 70 and the CPU driving power generator 50, both of which will be described later.

The CPU 60 is driven by the driving power of a core voltage Vcore (a voltage level of driving power is represented by V5 in FIGS. 1 and 2), supplied from the CPU driving power generator 50 (to be described later). The CPU 60 performs calculations, data processing operations, etc. The CPU 60 generates a voltage identification (VID) code signal to determine a level of the core voltage Vcore. This VID is outputted to the CPU driving power generator 50.

The CPU 60 includes a VID pin (not shown) to output a VID code signal. The VID code signal contains information about the voltage level of the core voltage Vcore. For example, Pentium 4, which is a CPU 60 manufactured by Intel Inc. outputs a digital VID code signal in 5 bit output from 5 VID pins to the CPU driving power generator 50. The CPU driving power generator 50 uses the outputted digital VID code signal to determine the level of the core voltage of the CPU 60.

The CPU 60 may operate both in a normal mode and a power saving mode. The power saving mode of the CPU 60 may include various levels of sleep modes, including at least one mode called a deeper sleep mode, such as, for example, the C4 state according to the advanced configuration and power interface (ACPI) standards, and another mode called a deep sleep mode, such as, for example, the C3 state according to advanced configuration and power interface (ACPI) standards. The power saving mode of the CPU 60 may also be adjusted to power saving modes according to standards other than the ACPI standards.

The CPU driving power generator 50 supplies driving power V5 to drive the CPU 60. In other words, the CPU driving power generator 50 outputs a driving voltage, e.g., the core voltage Vcore, at a level which drives the CPU 60 based on the VID code signal supplied from the CPU 60.

The CPU driving power generator 50 includes a power output part 57 which outputs the core voltage Vcore and a pulse width modulation (PWM) generator 51 which controls the level of the core voltage Vcore outputted from the power output part 57.

Figure 2:
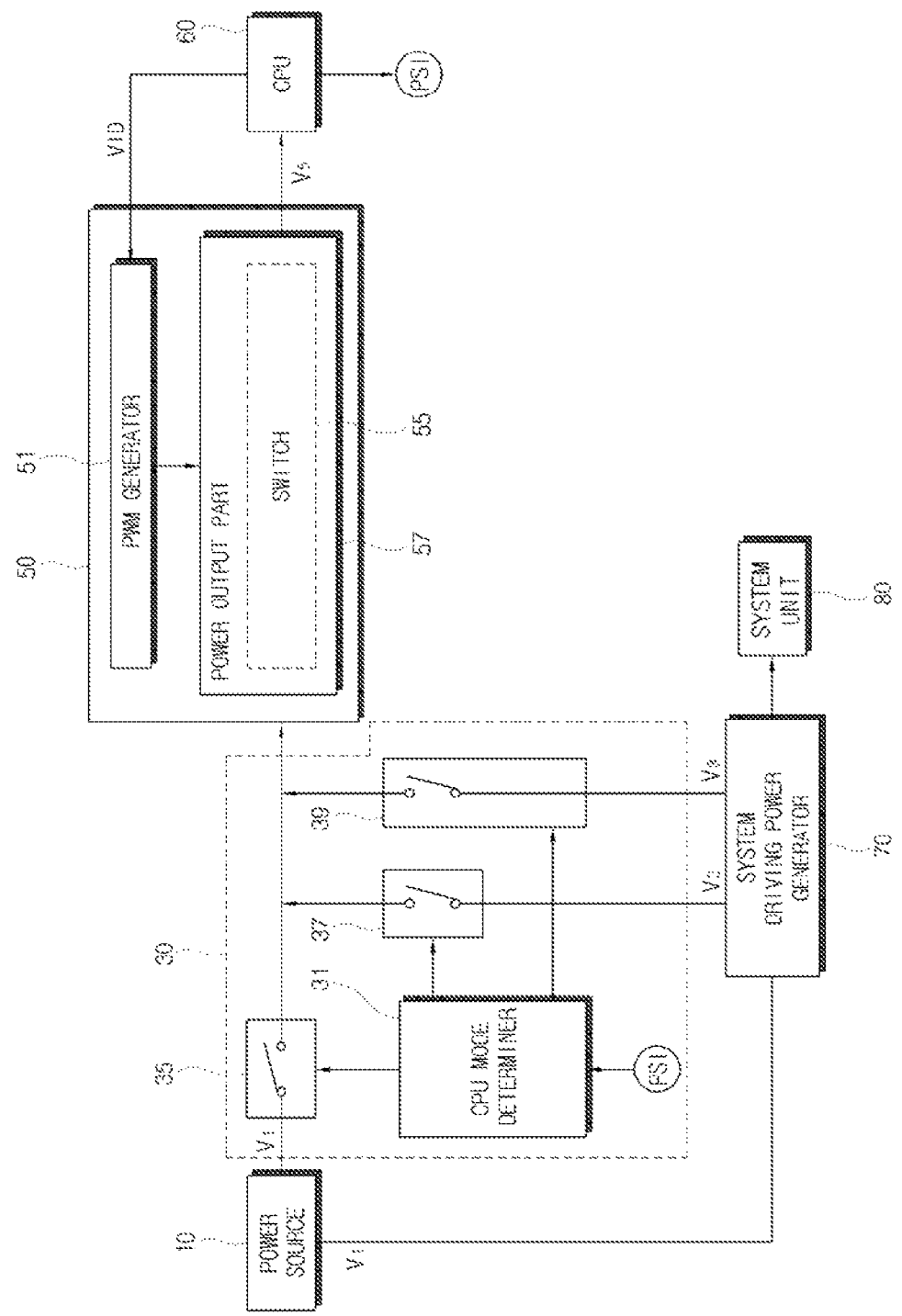
FIG. 2 is a control block diagram of a computer according to a second embodiment of the present invention.

The system unit 80 includes internal parts of the computer according to an embodiment of the present invention, except for the CPU 60, the power source 10, the CPU driving power generator 50, the system driving power generator 70 and the controller 30, as shown in FIGS. 1 and 2.

The system driving power generator 70 converts the source power V1 inputted from the power source 10 so that it can be outputted to the system unit 80. The system driving power generator 70 includes a converter which converts the input source power V1 into various voltage levels, e.g., 1.8V, 3.3V, 5V and 12V, which are suitable for respective ICs of the system unit 80.

The controller 30 controls the power output from the power source 10 and the system driving power generator 70, which is sent to the CPU driving power generator 50 according to an operation mode of the CPU 60.

The controller 30 includes a first switch 35, a second switch 37, and a CPU mode determiner 31. The first switch 35 is switched on and off to supply the source power V1 outputted from the power source 10 to the CPU driving power generator 50. The second switch 37 is switched on and off to supply the system power (a first voltage level of the system power is represented by V2 in FIGS. 1 and 2) outputted from the system driving power generator 70 to the CPU driving power generator 50. The CPU mode determiner 31 controls a switching operation of the first switch 35 and the second switch 37 according to the operation mode of the CPU 60.

The CPU mode determiner 31 determines the operation mode of the CPU 60 and thereby controls the first switch 35 and the second switch 37. The CPU mode determiner 31 may determine the operation mode of the CPU 60 according to a current level as shown in the following table or according to a power status indicator (a "PSI", to be described later).

TABLE

| PSI | Operation mode of CPU | Current |
|-----|----------------------|---------|
| 1 | Normal mode | i > preset value |
| 0 | Power saving mode | i < preset value |

In this first embodiment, the CPU mode determiner 31 may determine that the CPU 60 operates in the normal mode when the level of the current supplied to the CPU 60 is larger than a preset level, and determines that the CPU 60 operates in the power saving mode when the level of the current is smaller than the preset level.

Additionally, the CPU mode determiner 31 may determine whether the CPU 60 operates in the normal mode or in the power saving mode by receiving a power status indicator (PSI) corresponding to the operation mode of the CPU 60. There are also other ways to determine whether the CPU 60 is operating in the normal mode or the power saving mode.

The CPU mode determiner 31 controls the respective switches according to the operation mode of the CPU 60. Specifically, when the CPU mode determiner 31 determines that the CPU 60 is operating in the normal mode, the CPU mode determiner 31 turns on the first switch 35 to input the source power V1 output from the power source 10 to the CPU driving power generator 50. In the normal mode, a voltage of the source power V1 which has been outputted from the power source 10 may be, e.g., 9-19V or 9-12.6V.

When the CPU mode determiner 31 determines that the CPU 60 is operating in the power saving mode, the CPU mode determiner 31 turns off the first switch 35 and turns on the second switch 37 to input the system power V2, generated by the system driving power generator 70, to the CPU driving power generator 50. At this point, a voltage of the system power V2 inputted from the system driving power generator 70 preferably has a lower voltage than the voltage inputted from the power source 10. For example, the voltage of the system power V2 inputted to the CPU driving power generator 50 may be 5V or 3.3V. Other voltages may also be used in accordance with the present invention.

Figure 3A:
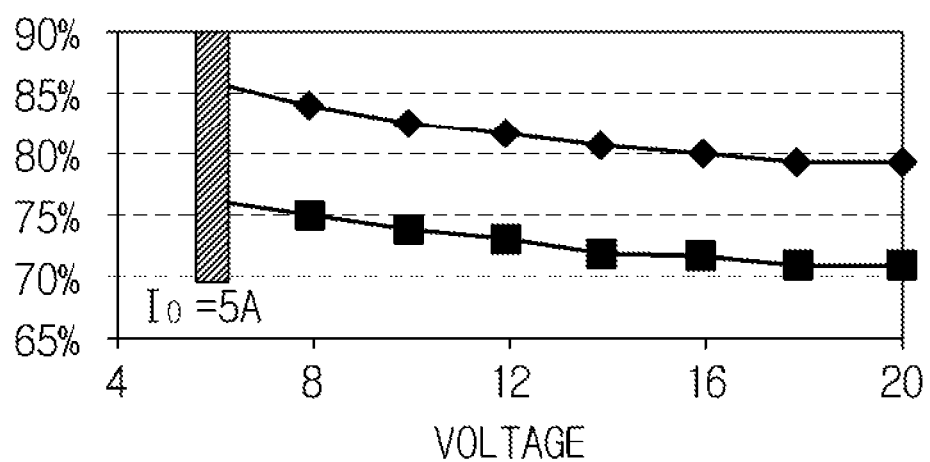
FIGS. 3A through 3C are graphs which illustrate the efficiency of a CPU driving power generator according to aspects of the present invention.
Figure 3B:
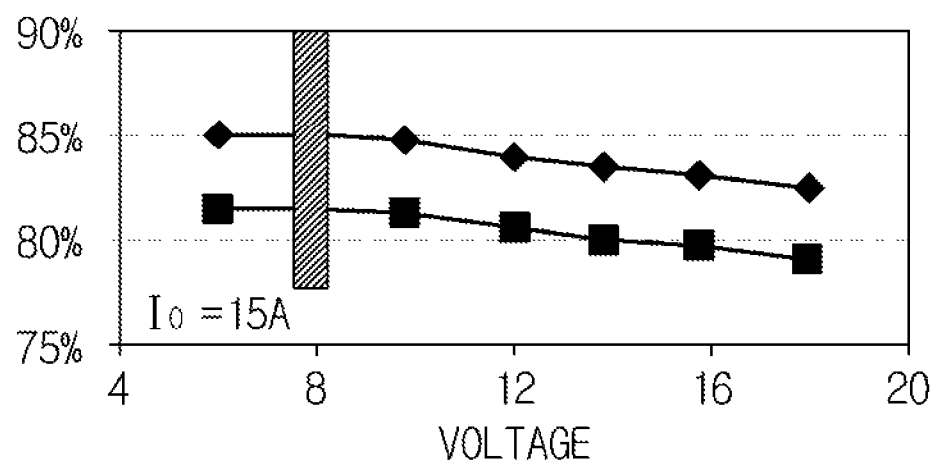
Figure 3C:
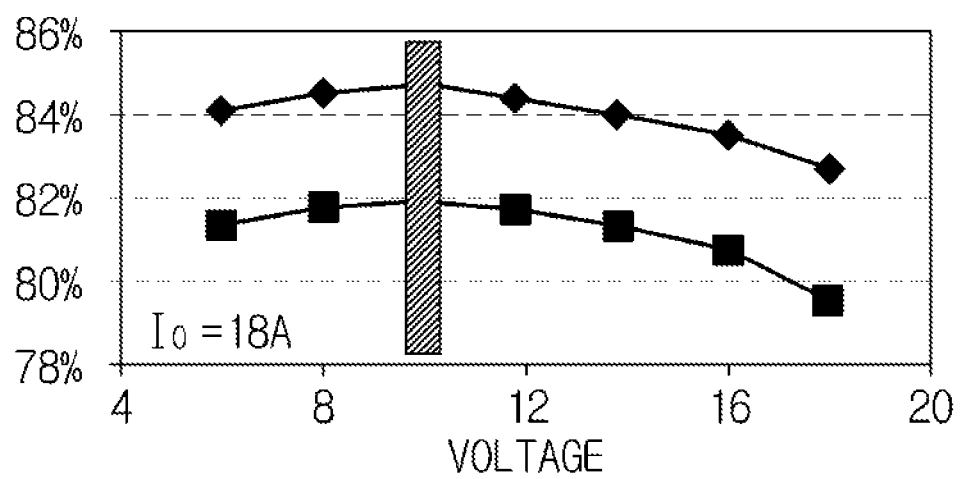

Referring to FIGS. 3A through 3C, the CPU driving power generator 50 preferably receives a voltage at a low level to improve internal power efficiency while operating with a current at a low level.

The CPU mode determiner 31 may output the PSI of logic values which are different from each other when the operation mode of the CPU 60 is switched between the normal mode and the power saving mode. For example, the CPU mode determiner 31 outputs the PSI at a low level when the CPU 60 operates in the power saving mode, and outputs the PSI at a high level when the CPU 60 is converted to the normal mode.

FIG. 2 is a control block diagram of a computer according to a second embodiment of the present invention.

Like the computer in FIG. 1, a computer in FIG. 2 includes a power source 10, a CPU 60, a system unit 80, a CPU driving power generator 50, a system driving power generator 70 and a controller 30.

The controller 30 according to the second embodiment of the present invention includes a CPU mode determiner 31, a first switch 35, a second switch 37 and a third switch 39.

The CPU mode determiner 31 in FIG. 2 classifies a power saving mode of the CPU 60 into a first power saving mode and a second power saving mode in order to control the respective switches. In this second embodiment, the first power saving mode and the second power saving mode include a deep sleep mode and a deeper sleep mode, respectively, according to advanced configuration and power interface (ACPI) standards. The deep sleep mode and deeper sleep mode are also referred to as a deep sleep sub-mode and a deeper sleep sub-mode, respectively. The invention is not limited to using ACPI standards as the first power saving mode and the second power saving mode.

The CPU mode determiner 31 determines which operation mode the CPU 60 is operating in, according to a power status indicator (PSI), and determines whether the CPU 60 operates in the deep sleep mode or in the deeper sleep mode by using signals such as DPRSLP and DPRSLPVR, respectively, which are transmitted from the CPU 60.

When the CPU mode determiner 31 determines that the CPU 60 is operating in the normal mode, the CPU mode determiner 31 turns on the first switch 35 in order to supply source power V1, e.g., 12V, which is outputted from the power source 10 to the CPU driving power generator 50. When the CPU mode determiner 31 determines that the CPU 60 is operating in the deep sleep mode, the CPU mode determiner 31 turns on the second switch 37 to supply system power V2, e.g., 5V, which is outputted from the system driving power generator 70 to the CPU driving power generator 50. When the CPU mode determiner 31 determines that the CPU 60 is operating in the deeper sleep mode, the CPU mode determiner 31 turns on the third switch to supply system power (a second voltage level of the system power is V3), e.g., 3.3V, which is outputted from the power source 10 to the CPU driving power generator 50.

After the CPU mode determiner 31 determines which mode the CPU is operating in and switches the corresponding switch, the CPU driving power generator 50 generates and outputs a driving voltage at a level which drives the CPU 60.

FIG. 3A illustrates a graph of voltage and efficiency according to a current which is outputted from the CPU driving power generator 50.

Switching loss and conduction loss are generated in the CPU driving power generator 50. Here, the switching loss is generated by a switch 55 which is switched on and off according to a pulse width modulation (PWM) signal of a PWM generator 51. Here, the conduction loss is approximately proportional to a square of the current. Thus, as the current level increases, the conduction loss increases by the square of the current increase. The switching loss is proportional to a length of a section where the current and the voltage are changed at the same moment when the switch 55 is switched on and off.

Based on the foregoing characteristics, if, for example, a core current is 5 A, the relationship between the voltage and the efficiency in the normal mode and the power saving mode, respectively, of the CPU driving power generator 50 is represented by the graph in FIG. 3A. As the graph in FIG. 3A illustrates, if the level of the core current is 5 A, a voltage supplied to the CPU driving power generator 50 is approximately 5V (represented by the vertical bar). In a second example, if the core current is 15A, the relationship between the voltage and the efficiency in the CPU driving power generator 50 is represented by the graph in FIG. 3B. As the graph in FIG. 3B illustrates, if the level of the core current is 15A, a voltage supplied to the CPU driving power generator 50 is approximately 8V (represented by the vertical bar). In a third example, if the core current is 18A, the relationship between the voltage and the efficiency in the CPU driving power generator 50 is represented by the graph in FIG. 3C. As the graph in FIG. 3C illustrates, if the level of the core current is 18A, a voltage supplied to the CPU driving power generator 50 is approximately 10V (represented by the vertical bar). As FIGS. 3A-3C illustrate, the power efficiency of the CPU driving power generator 50 approaches optimal levels of efficiency as the core current increases from 5A to 15A.

Figure 4:
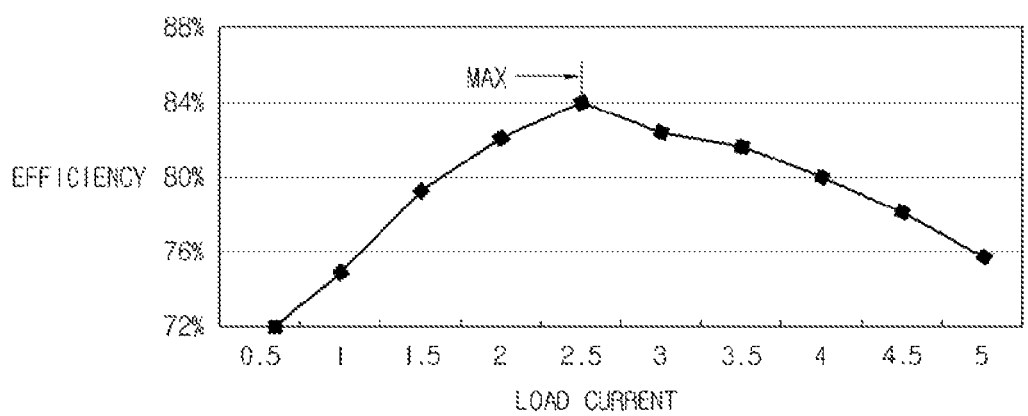
FIG. 4 is a graph which illustrates the efficiency of a system driving power generator according to aspects of the present invention.

FIG. 4 illustrates the relationship between the current and the efficiency of the system driving power generator 70 according to an embodiment of the present invention. As illustrated in FIG. 4, the power efficiency of the system driving power generator 70 is at an optimal efficiency when a current of approximately 2.5 A flows therein. The computer according to aspects of the present invention lowers the level of the current supplied to its respective parts and thereby reduces power consumption when the CPU 60 operates in the power saving mode. Also, a lower current flows in the system driving power generator 70. At this time, a current at a 1.5 A higher level than that of the conventional system driving power generator 70 flows in the system driving power generator 70 according to an embodiment of the present invention.

FIG. 5 is a table which compares the efficiency of a computer according to an embodiment of the present invention with the efficiency of a conventional computer.

The table shows changes in efficiency when the system driving power generator 70 includes a DC/DC converter and the CPU driving power generator 50 includes a voltage regulation module (VRM) of the CPU 60.

Conventionally, the current supplied to the DC/DC converter is 0.5 A and 1 A. In an embodiment of the present invention, however, the current supplied to the DC/DC converter is 2 A and 2.5 A when an output of the DC/DC converter is supplied as input power of the VRM in the CPU 60. Accordingly, when 0.5 A and 1 A are supplied to the conventional DC/DC converter, the efficiency of the conventional DC/DC converter is 70% and 74%, respectively. In an embodiment of the present invention, when 2 A and 2.5 A are supplied to the DC/DC converter according to aspects of the present invention, the efficiency of the DC/DC converter according to an embodiment of the present invention is 88% and 92%, respectively.

Additionally, when the current supplied to the CPU 60 is 5 A and 15 A, the efficiency of the VRM in the CPU 60 is 87% and 89%, respectively. As FIG. 5 shows, when a current of 2 A and 2.5 A is supplied to the DC/DC converter in an embodiment of the present invention, 0.8 Watts and 0.9 Watts are saved, respectively, as compared to the conventional computer. As a result of saving 0.8 Watts and 0.9 Watts, this embodiment of the present invention increases the utilization time of a battery by approximately 28 minutes and 9 minutes, respectively.

Figure 6:
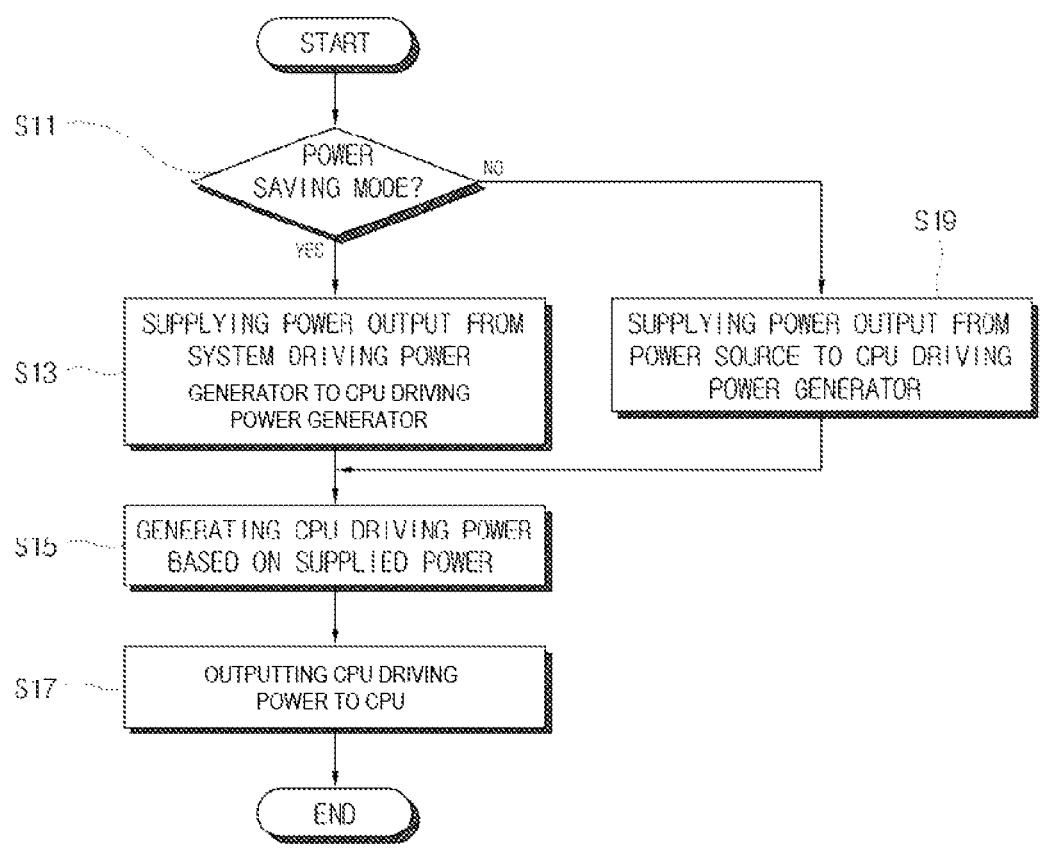
FIG. 6 is a control flowchart of the computer according to aspects of the present invention.

FIG. 6 is a control flowchart of a computer according to an embodiment of the present invention.

As shown in FIG. 6, the CPU mode determiner 31 of the computer according to aspects of the present invention determines whether the CPU 60 is operating in the power saving mode at operation S11. If the CPU mode determiner 31 determines that the CPU 60 is operating in the normal mode, not in the power saving mode, the CPU mode determiner 31 adjusts the first switch 35 to supply the source power V1 which is outputted from the power source 10 to the CPU driving power generator 50 at operation S19. The CPU driving power generator 50 generates the driving power V5 of the CPU 60 from the source power V1, which is supplied from the power source 10 at operation S15, and then outputs the generated CPU driving power V5 to the CPU 60 at operation S17.

If the CPU mode determiner 31 determines that the CPU 60 is operating in the power saving mode at operation S11, the CPU mode determiner 31 adjusts the second switch 37 to supply the system power V2 which is outputted from the system driving power generator 70 to the CPU driving power generator 50 at operation S13. The CPU driving power generator 50 generates the CPU driving power V5 from the system power V2, which is supplied from the system driving power generator 70 at operation S15, and then outputs the CPU driving power V5 to the CPU 60 at operation S17.

In the foregoing embodiments, the computer according to aspects of the present invention includes one or two power saving modes, but the present invention is not limited thereto. Alternatively, the computer according to aspects of the present invention may include power saving modes divided in several stages, and control the levels V2 and V3 (as shown in FIGS. 1 and 2) in various ways.

As described above, the computer according to aspects of the present invention supplies a voltage having an improved efficiency which depends on the level of the current supplied to the CPU 60, i.e., an efficiency which depends on the operation mode of the CPU 60. The computer according to aspects of the present invention thereby improves the power efficiency of the CPU driving power generator 50.

Additionally, the computer according to aspects of the present invention controls the level of the current supplied to the system driving power generator 70, thereby also improving the power efficiency of the system driving power generator 70.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus comprising:
  a Central Processing Unit (CPU) operable in one of a plurality of modes relating to a power consumption state;
  a first driving power generator configured to generate a plurality of driving powers from a source power and configured to provide each of the driving powers to components of the apparatus respectively, the driving powers having lower voltage levels than the source power;
  a second driving power generator configured to generate driving power to drive the CPU; and
  a controller configured to select one among the source power and the driving powers generated by the first driving power generator corresponding to current mode of the CPU, and to supply the selected driving power to the second driving power generator so that the second driving power generator generates the driving power for the CPU based on the selected driving power.

2. The apparatus of claim 1, wherein the controller selects the source power if the current mode of the CPU is a first mode, and selects one of the driving powers generated by the first driving power generator if the current mode of the CPU is a second mode, and
  wherein the CPU in the first mode consumes more power than the CPU in the second mode.

3. The apparatus of claim 2, wherein the first mode is a normal mode and the second mode is one of a plurality of power saving modes.

4. The apparatus of claim 1, wherein the CPU is configured to output a Voltage IDentification (VID) signal, and
  wherein the second driving power generator determines the current mode of the CPU corresponding to the VID signal from the CPU.

5. The apparatus of claim 4, wherein the CPU comprises a VID pin which outputs the VID signal.

6. The apparatus of claim 4, wherein the second driving power generator comprises:
  a power output unit configured to output the driving power for the CPU; and
  a Pulse Width Modulation (PWN) generator configured to adjust a voltage level of the driving power output from the power output unit according to the VID signal from the CPU.

7. The apparatus of claim 1, wherein the controller includes a first switch which can be switched on and off to selectively supply the source power to the second driving power generator, and a second switch which can be switched on and off to selectively supply a first driving power of the driving powers output from the first driving power generator to the second driving power generator.

8. The apparatus of claim 7, wherein the controller turns on the first switch and turns off the second switch if the current mode is normal mode, and
  wherein the controller turns off the first switch and turns on the second switch if the current mode is power saving mode.

9. The apparatus of claim 7, further comprising a third switch which can be switched on and off to selectively supply a second driving power of the driving powers output from the first driving power generator to the second driving power generator, the second driving power having a different voltage level from the first driving power.

10. The apparatus of claim 9, wherein, among the first switch, the second switch and the third switch, the controller only turns on the first switch if the current mode is normal mode, only turns on the second switch if the current mode is a deep sleep mode, and only turns on the third switch if the current mode is a deeper sleep mode.

11. The apparatus of claim 1, wherein the source power is provided from a battery.

12. The apparatus of claim 1, wherein the source power is provided from a power supply adapter.

13. The apparatus of claim 1, wherein the plurality of the driving powers generated by the first driving power generator have different voltage levels.

14. The apparatus of claim 1, wherein the plurality of modes of the CPU are defined based on Advanced Configuration and Power Interface (ACPI) standards.

15. A control method of an apparatus including a Central Processing Unit (CPU) operable in one of a plurality of modes relating to power consumption state, the control method comprising:

generating a plurality of driving powers from a source power by a first driving power generator, the driving powers having lower voltage levels than the source power;

providing each of the driving powers to components of the apparatus respectively from the first driving power generator; and generating driving power to drive the CPU by a second driving power generator and providing the driving power generated by the second driving power generator to the CPU, wherein the generating of the driving power to drive the CPU includes:
　selecting one among the source power and the driving powers generated by the first driving power generator corresponding to a current mode of the CPU; and
　supplying the selected driving power to the second driving power generator so that the second driving power generator generates the driving power for the CPU based on the selected one.

\* \* \* \* \*